United States Patent [19]

Okada et al.

[11] Patent Number: 4,973,135

[45] Date of Patent: Nov. 27, 1990

[54] ACTIVE MATRIX DISPLAY PANEL HAVING PLURAL STRIPE-SHAPED COUNTER ELECTRODES AND METHOD OF DRIVING THE SAME

[76] Inventors: Shinjiro Okada; Yasuyuki Tamura, both of c/o Canon Kabushiki Kaisha, 3-30-2 Shimomaruko, Ohta-ku, Tokyo, Japan

[21] Appl. No.: 313,305

[22] Filed: Feb. 21, 1989

Related U.S. Application Data

[63] Continuation of Ser. No. 765,235, Aug. 13, 1985, abandoned.

[30] Foreign Application Priority Data

| Aug. 22, 1984 | [JP] | Japan | 59-173177 |
| Aug. 27, 1984 | [JP] | Japan | 59-176822 |
| Aug. 27, 1984 | [JP] | Japan | 59-176823 |
| Dec. 17, 1984 | [JP] | Japan | 59-264386 |
| Dec. 17, 1984 | [JP] | Japan | 59-264388 |

[51] Int. Cl.$^5$ .......................... G02F 1/13; G09G 3/36
[52] U.S. Cl. ..................................... 350/334; 350/333; 350/336; 350/350 S; 340/784
[58] Field of Search ............... 350/333, 334, 350 S, 350/331 R, 336; 340/784, 805, 762, 807; 357/45

[56] References Cited

U.S. PATENT DOCUMENTS

| 4,040,721 | 8/1977 | Kurita | 350/333 |
| 4,112,333 | 9/1978 | Asars et al. | 350/334 |
| 4,367,924 | 1/1983 | Clark et al. | 350/350 S |
| 4,386,352 | 5/1983 | Nonomura et al. | 350/333 |
| 4,432,610 | 2/1984 | Kobayashi | 340/784 |
| 4,653,862 | 3/1987 | Morozumi | 350/333 X |
| 4,717,244 | 1/1988 | Hilsum et al. | 350/333 |
| 4,761,058 | 8/1988 | Okubo et al. | 350/333 |
| 4,770,501 | 9/1988 | Tamura et al. | 350/333 |
| 4,818,981 | 4/1989 | Oki et al. | 340/784 |
| 4,818,991 | 4/1989 | Gay | 340/784 |
| 4,834,505 | 5/1989 | Mighozato et al. | 350/334 |

FOREIGN PATENT DOCUMENTS

0034796 9/1981 European Pat. Off. .

OTHER PUBLICATIONS

Brody et al., "A 6x6 Inch 20 Lines-Per-Inch Liquid--Crystal Display Panel", IEEE Trans. on Elec. Dev., vol. ED-20, No. 11, Nov. 1973, pp. 995-100.

*Primary Examiner*—Stanley D. Miller
*Assistant Examiner*—Tai V. Duong

[57] ABSTRACT

A display panel is formed by arranging an active matrix base plate which is provided with a thin film transistor having a first electorde, a second electrodes as the source or drain and a third electrode as the gate, a picture element electrode connected to the first electrode, a second signal line leading from the second electrode, a third signal leading from the third electrode, and a plurality of counter electrodes disposed opposite to the picture element electrode and serving as first signal lines. The display panel is driven by applying scanning signals to two of the three types of signal lines, i.e., said first to third signal lines, and applying display signals to the remaining one type of signal line.

13 Claims, 16 Drawing Sheets

ACTIVE MATRIX DISPLAY PANEL HAVING PLURAL STRIPE-SHAPED COUNTER ELECTRODES AND METHOD OF DRIVING THE SAME

This application is a continuation of application Ser. No. 765,235, filed Aug. 13, 1985, now abandoned.

FIELD OF THE INVENTION AND RELATED ART

This invention relates to a display panel having image display devices such as liquid crystal devices and LED (light-emitting diode) devices and a method of driving the same and, more particularly, to a method of driving ferroelectric liquid crystal devices with an active matrix structure.

As a known liquid crystal display system, there is a matrix display system. This system has a large number of picture elements for the display of either an image or information. The picture elements are constituted by a scanning electrode group and a signal electrode group arranged in the form of a matrix, and a liquid crystal compound provided between the two electrode groups. In this system, if the display image density or display screen size is increased, enormous numbers of scanning electrodes and display electrodes are required. As a result, the response speed of the liquid crystal is reduced. In addition, so-called crosstalk occurs due to distribution of voltage to picture elements other than "ON" picture elements. To overcome these two drawbacks, there have been proposed various methods, e.g., a voltage averaging method, a dual frequency driving method, a divided matrix method and a multiplex matrix method. It is difficult however, for any of these methods to cope with the number of scanning lines accompanying the increase of display elements for complying with the increase of the display screen or image density. Recently, an active matrix display system has been contemplated and in practical use. In this system, the liquid crystal is driven directly by a plurality of switching elements such as field-effect transistors, which are provided corresponding to respective picture elements and arranged in the form of a matrix.

This active matrix system can solve the problem of crosstalk. However, where conventional liquid crystal (nematic) devices are used, display speed is limited. In addition, the display screen size has an upper limit imposed by the repetition frequency. The deficiency in case of the nematic liquid crystal can be improved by using a ferroelectric liquid crystal for the liquid crystal device. In this case, however, the simplification of the circuit structure accompanying the increase in display image density is insufficient, and further improvement is desired in this regard.

SUMMARY OF THE INVENTION

The present invention has been intended to solve the problems discussed above in the prior art, and its object is to greatly reduce the number of signal lines and simplify the circuit through improvement in circuit structure of display electrodes with an active matrix.

According to the present invention, there is provided a display panel, which comprises an active matrix base plate comprising a field effect transistor and a picture element electrode connected to a first electrode other than the gate of the field effect transistor, and a plurality of counter electrodes disposed opposite to the picture element electrode.

According to the present invention, there is also provided a method of driving a display panel of the type comprising an active matrix base plate which in turn comprises a thin film transistor having a first electrode, a second electrode as the source or drain and a third electrode as the gate, a picture element electrode connected to the first electrode, a second signal line leading from a connected to the second electrode, a third signal line leading from or connected to the third electrode, and a plurality of counter electrodes disposed opposite to the picture element electrode and serving as first signal lines; the method comprising: applying scanning signals to two of the three types of signal lines comprising said first to third signal lines, and applying display signals to the remaining one type of signal line.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
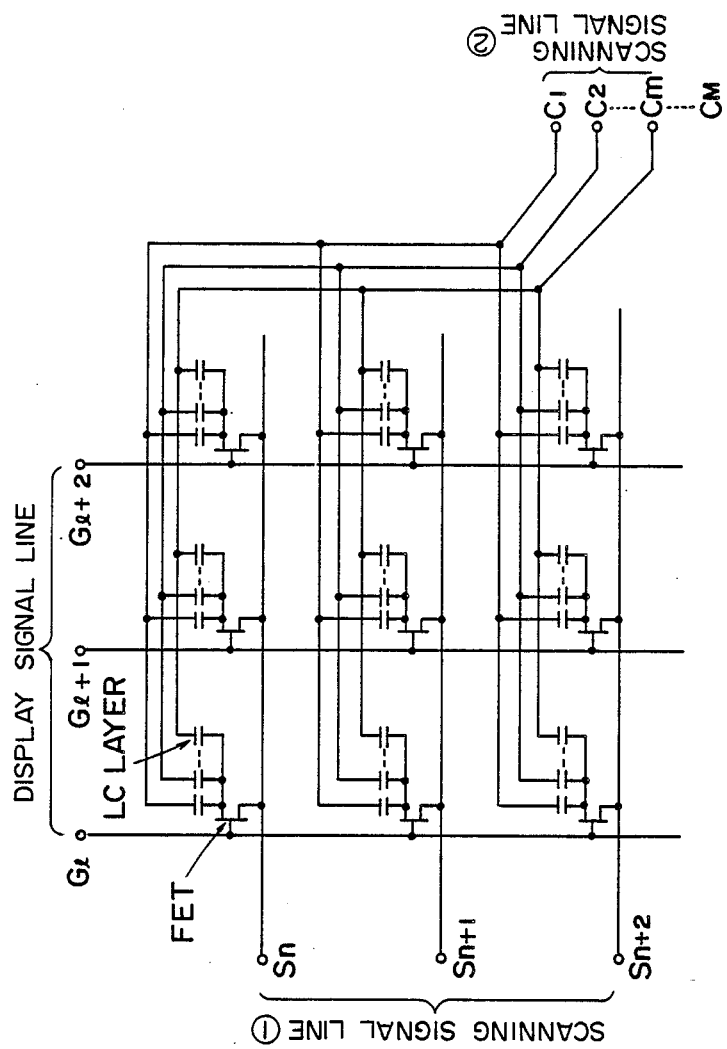
FIG. 1 is a circuit diagram illustrating a basic concept of the invention.

FIG. 1 is a circuit diagram illustrating a basic concept of the invention. As is shown in the Figure, field-effect transistors (hereinafter referred to as FETs) are arranged in a matrix. A first electrode or terminal serving as either source or drain of each FET is provided with a picture element electrode. A plurality of counter electrodes are provided so that they oppose their respective picture element electrodes. A scanning signal is applied to a second electrode or terminal, which is constituted by the drain or source other than that which constitutes the first terminal, and a scanning signal is also applied to the counter electrodes which are disposed parallel to the second terminal. A display signal is applied to a gate line leading from the gate, i.e., a third electrode or terminal of the FET, the gate line extending perpendicular to the scanning signal line and counter electrodes. Where there are n picture elements for display, generally $\sqrt{n} \times 2$ lead lines are necessary, whereas approximately $3\sqrt{n} \times 3$ lead lines are necessary according to this invention. Where there is no natural number corresponding to the cubic root of n, it is necessary to slightly increase the number of lead lines than the above estimation.

As is apparent from the circuit structure shown in FIG. 1, according to the invention, image display is accomplished by using two of three signal line groups as scanning signal line groups for selection of writing lines while feeding a display signal to the remaining signal line group. More specifically, a signal voltage is applied to the gate of an FET so that the FET is in a gate "ON" state, while an electric field is set up simultaneously between the source and drain, i.e., the terminals other than the gate, of the FET and the polarity of the field is controlled to switch the display state between two states, i.e., a first orientation state and a second orientation state. According to the invention, therefore, a ferroelectric liquid crystal is used, which can selectively assume either one of two, i.e., first and second, optically stable states depending on the polarity of the electric field. Thus, a ferroelectric liquid crystal having bistability with respect to the electric field, is used. With an FET serving as an active element, selection as to which one of the two terminals other than the gate terminal serves as source and the other as drain, depends on the polarity of the applied voltage regardless of whether the FET is of p- or n-type. In case of an n-type FET, the terminal at a lower potential is the source, while with a p-type FET, the terminal at a higher potential serves as the source. The voltage levels at the individual signal electrodes may be set to desired values and are not restricted to the values in examples given below so long as certain potential differences are retained between the signals.

A specific example of the image display using a liquid crystal display device according to the invention will now be described with reference to FIGS. 1 and 4 to 7.

Figure 5:
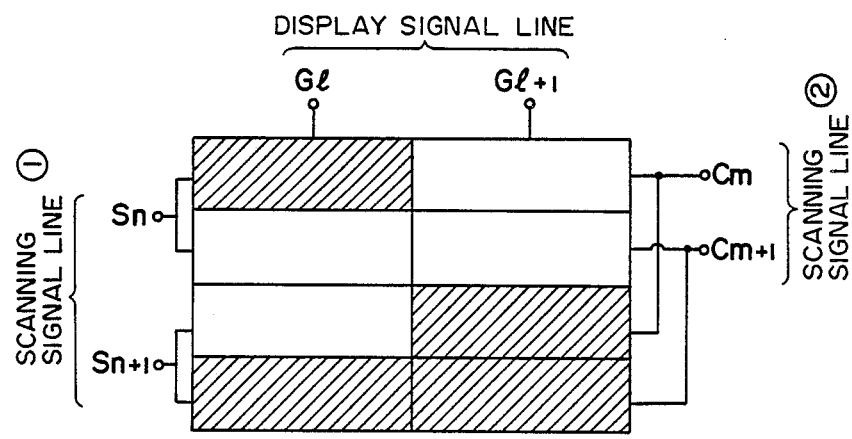
FIG. 5 is a view for illustrating a display pattern of picture elements.

In the circuit of FIG. 1, the driving or active elements are n-type FETs, preferably TFTs (thin film transistors), and the liquid crystal is a ferroelectric liquid crystal. Various voltages for writing a predetermined display pattern as shown in FIG. 5 are set to desired values which can satisfy the following conditions.

(1) A case where "bright" is written at a position with n=a among scanning signal lines ①, m=b among scanning signal lines ② and l=c among display signal lines:

$V_{Cm} + V_{LC} < V_{Sn}$ $(n = a, m = b)$ } "bright" is written on selected ①, ② lines
$V_{G1} - V_p > V_{Cm} + V_{LC}$ $(m = b, 1 = c)$ $V_{G1} - V_p < V_{Cm} + V_{LC}$ $(m = b, 1 \neq c)$ } non-writing points on selected ①, ② lines $V_{G1} - V_p < V_{Cm} + V_{LC}$ $(m \neq b, 1 = \text{all})$
or
$V_{Cm} + V_{LC} > V_{Sn}$ $(n = a, m \neq b)$ } ① selected ② non-selected $V_{Cm} - V_{LC} < V_{Sn}$ $(m = b, n \neq a)$
and
$V_{Cm} + V_{LC} > V_{Sn}$ $(m = b, n \neq a)$ } ① non-selected ② selected $V_{CM} - V_{LC} < V_{Sn}$ $(m \neq b, n \neq a)$
and
$V_{Cm} + V_{LC} > V_{Sn}$ $(m \neq b, n \neq a)$
or
$V_{G1} - V_p < V_{Sn}$ $(n \neq a, 1 = \text{all})$
$V_{G1} - V_p < V_{Cm} + V_{LC}$ $(m \neq b, 1 = \text{all})$ } ① non-selected ② non-selected (2) A case where "dark" is writtn at a position with n=s among scanning signal lines ①, m=among scanning signal lines ② and l≠c among display signal lines:

$V_{Cm} - V_{LC} > V_{Sn}$ $(n = a, m = b)$ } "dark" is written on selected ①, ② lines
$V_{G1} - V_p > V_{Sn}$ $(n = a, 1 \neq c)$ $V_{G1} - V_p < V_{Sn}$ $(n = a, 1 = c)$ } non-selected points on selected ①, ② lines $V_{Cm} - V_{LC} < V_{Sn}$ $(n = a, m \neq b)$
and
$V_{Cm} + V_{LC} > V_{Sn}$ $(n = a, m \neq b)$ } ① selected ② non-selected $V_{G1} - V_p < V_{Sn}$ $(n \neq a, 1 = \text{all})$
or
$V_{Cm} - V_{LC} < V_{Sn}$ $(n \neq a, m = b)$ } ① non-selected ② selected $V_{CM} - V_{LC} < V_{Sn}$ $(m \neq b, n \neq a)$
and
$V_{Cm} + V_{LC} > V_{Sn}$ $(m \neq b, n \neq a)$
or
$V_{G1} - V_p < V_{Sn}$ $(n \neq a, 1 = \text{all})$
$V_{G1} - V_p < V_{Cm} + V_{LC}$ $(m \neq b, 1 = \text{all})$ } ① non-selected ② non-selected In the above, respective symbols represent the following:
$V_{LC}$: Absolute value of threshold voltage of a ferroelectric liquid crystal,
$V_p$: Gate threshold voltage of the FETs constituting the active matrix,
$V_{Sn}$: Voltage on scanning signal line ①,
$V_{Cm}$: Voltage on scanning signal line ②, and
$V_{Gl}$: Voltage on display signal line.

Figure 4:
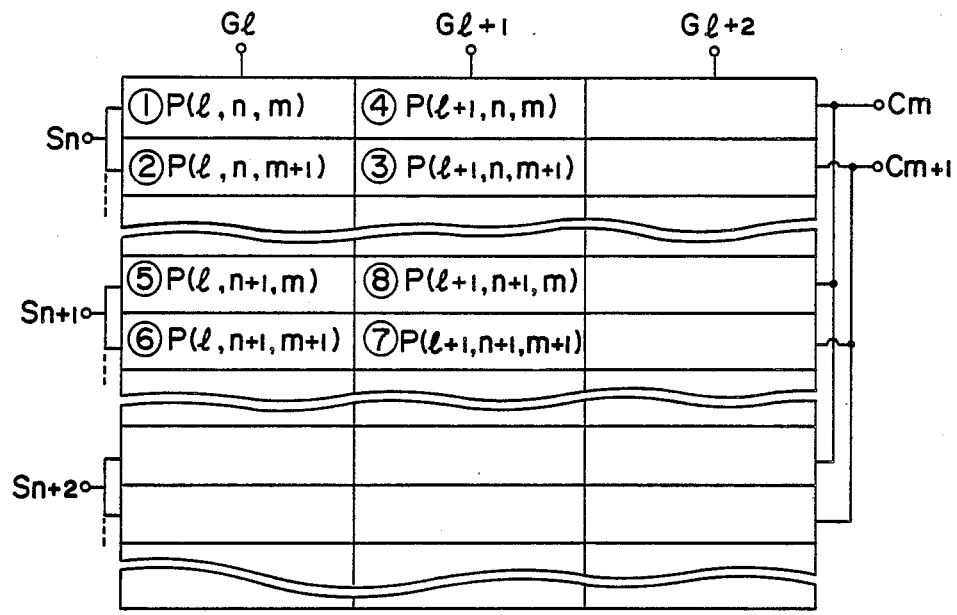
FIG. 4 is a view showing coordinates of picture elements.
Figure 6:
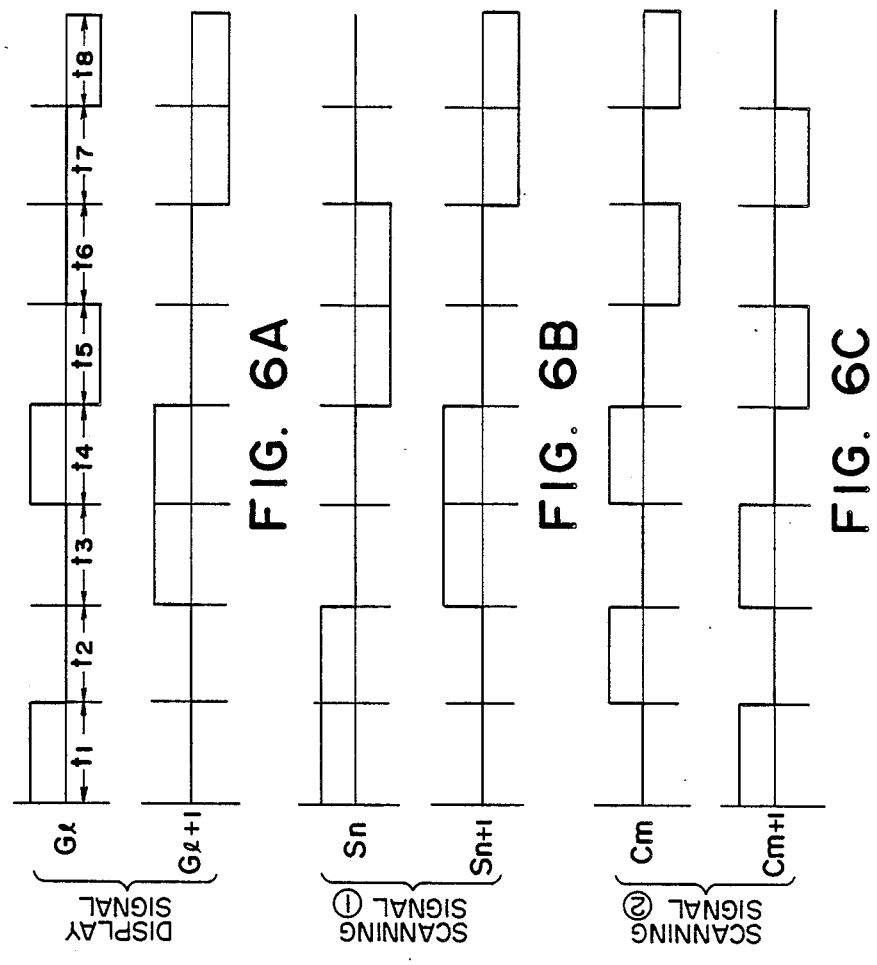
FIGS. 6A to 6C show waveform diagrams of electric signals applied to scanning lines and signal lines.
Figure 7:
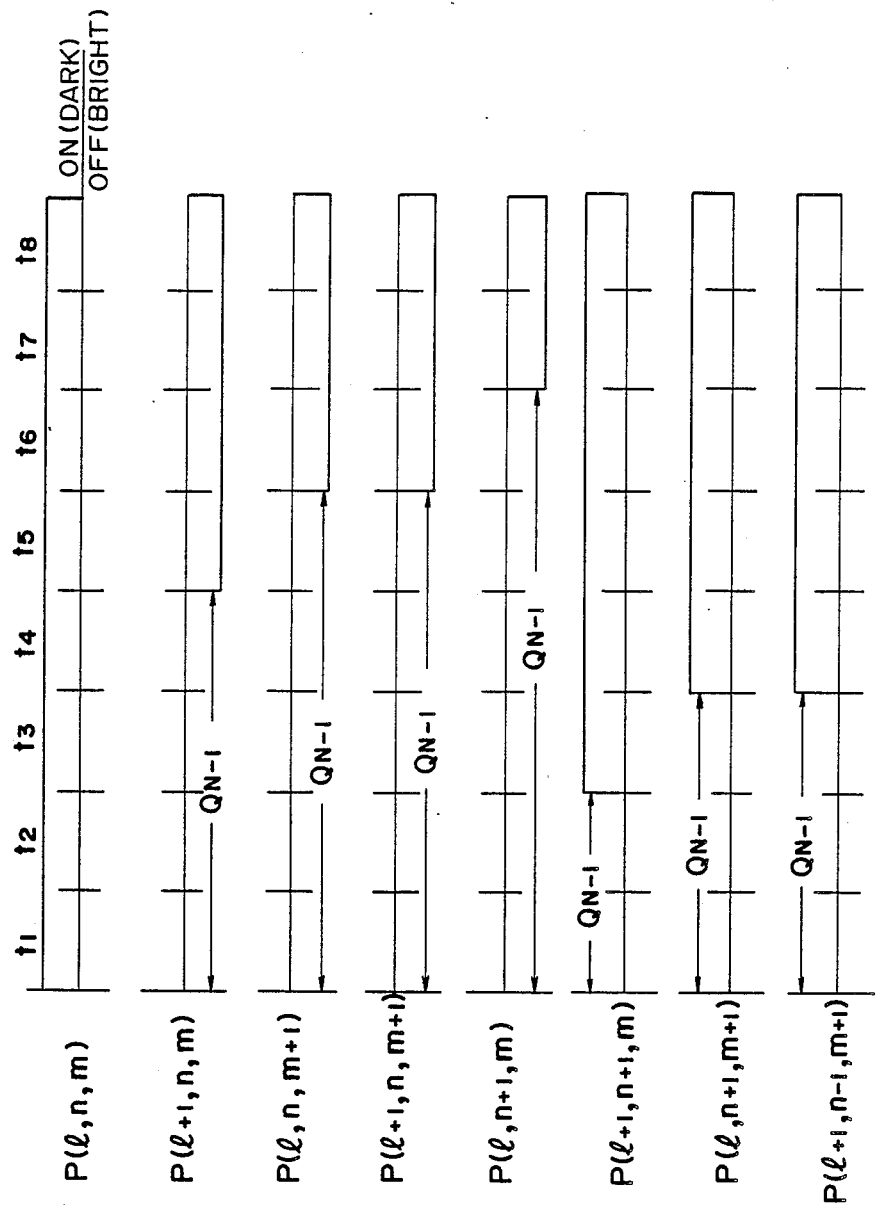
FIG. 7 is a view for explaining a writing operation.

FIG. 6 shows the wave forms of the above various signal voltages at phases $t_1$ to $t_8$. In the diagrams of FIG. 6, the ordinate represents the voltage, and the abscissa represents the time. FIG. 7 illustrates a writing operation, when the electric signals as shown in FIG. 6 are given. In the diagrams of FIG. 7, the ordinate represents the display state, with the upper side showing "on" (dark) state and the lower side showing "off" (bright) state, and the abscissa represents the time. The diagrams show that the picture elements are "dark" or "bright" at various time phases. In the Figure, $Q_{N-1}$ indicates that the state of signal in the preceding scanning cycle is retained. The positions or coordinates of the individual picture elements indicated in FIG. 7 are shown in FIG. 4. The desired display pattern shown in FIG. 5 is completed through the operations shown above at the phases $t_1$ to $t_8$.

While an embodiment of $V_p=0$ is explained with reference to FIG. 6, $V_G$ (i.e., gate voltage) may be shifted by $V_p$ in a case where $V_p \neq 0$. Where "DO-BAMBC" is used as the ferroelectric liquid crystal in the above example, $V_{LC}=1$ to 20 V, the operating temperature is 75° to 85° C., and the time necessary for writing one picture element is approximately 50 μsec.

The circuit structure according to the invention is the same as the case where a passive matrix is formed over the picture elements of an ordinary active matrix. Therefore, crosstalk can occur as in the case of an ordinary passive matrix. Accordingly, the optimum conditions will be explained when an ordinary crosstalk is taken into consideration.

Figure 8A:
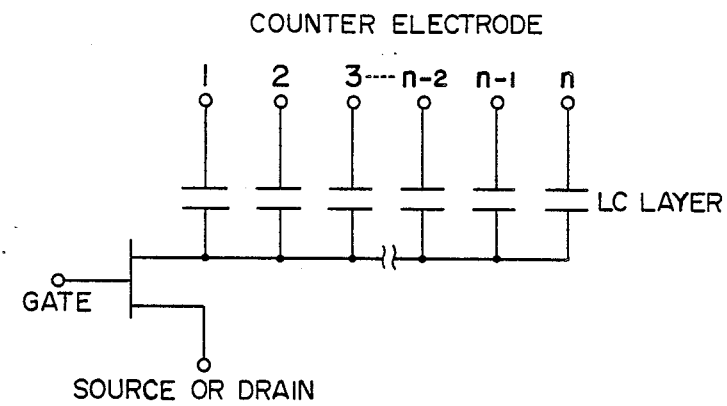
FIGS. 8A and 8B show picture element electrodes for a display electrode in an active matrix.

Referring to FIG. 8, when a counter electrode is used as one scanning line and a picture element in the active matrix is selected by the other scanning signal line, the 1-st to n-th counter electrodes operate independently, as shown in FIG. 8A, and they do not influence with each other a voltage applied across a light control material (e.g., LC) sandwiched between the active matrix electrodes and counter electrodes set picture elements separately provided corresponding to the counter electrodes.

Figure 8B:
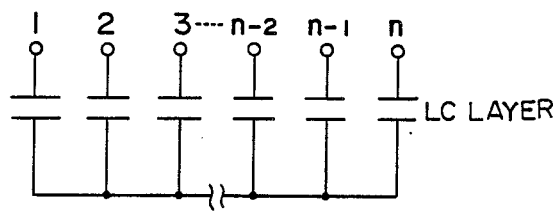

When no picture element in the active matrix is selected, however, the gate is turned "OFF", so that the picture elements separately provided corresponding to the 1-st to n-th counter electrodes are short-circuited through the picture element electrodes of the active matrix, as shown in FIG. 8B. In this case, a voltage that is applied when one of the 1-st to n-th counter electrodes is selected is distributed to the picture element electrodes of the active matrix.

The scanning signal voltage applied to the counter electrode of a selected picture element is assumed to be V and the voltage on the other counter electrodes for the non-selected picture elements is 0. More precisely, the V is defined by the equation:

$$V = V_{ON} - V_{OFF}$$

where $V_{ON}$ is the selecting scanning signal voltage and $V_{OFF}$ is the non-selecting scanning signal voltage.

In this case, when the voltage V is applied to an m-th ($1 \leq m \leq n$) selected scanning line, the voltage V' that appears on the other scanning lines, i.e., between the electrodes of the non-selected picture elements, can be expressed as $$V' = V \frac{1}{n}$$

The voltage V'' on the scanning signal line m is given as $$V'' = V \frac{n-1}{n}$$

The voltage $V_{ON}$ may exceed the threshold voltage of the light-control material used (e.g., LC), but the voltage $V_{OFF}$ may not. Hence, the three voltage values V', V'' and $V_{OFF}$ must be smaller than the absolute value of the threshold voltage of the light-control material used.

If $V_{OFF}$ is defined as equal to $aV_{ON}$, the three voltage values noted above are all functions of $V_{ON}$, so that it is necessary to meet a condition $$\max(V', V'', V_{OFF}) < V_0 \qquad (1)$$

where $V_0$ is the threshold voltage of the light control material used.

The inequality (1) can be rewritten as $$\max\left(\frac{V_{ON}}{n}(1-a), \frac{n-1}{n} V_{ON}(1-a), aV_{ON}\right) < V_0 \qquad (2)$$

In the inequality (2), if $n \neq 1$, then $$\frac{1}{n} V_{ON}(1-a) \leq \frac{n-1}{n} V_{ON}(1-a)$$

To obtain an optimum value of a under a condition of $n \neq 1$, we set $$\frac{n-1}{n} V_{ON}(1-a) = aV_{ON}$$

Then, we have $$a = \frac{n-1}{2n-1} \qquad (3)$$

When $n=1$, a is meaningless.

Therefore, the problem of the inversion of "OFF" picture elements into the "ON" state under a condition of $V_{ON} < \frac{1}{a} V_0$ can be eliminated by applying the voltage $V_{ON}$ to a selected scanning signal line while applying the voltage $aV_{ON}$ (a being the constant given by the equation (3) and n being the number of scanning signal lines) to the non-selected scanning signal lines.

Actually, there are ferroelectric liquid crystals, of which the memory state can be inverted with application of a low electric field for a long time. Therefore, the voltage $V_{ON}$ is desirably as low as possible. In addition, the number n is restricted by the scanning time.

Figure 9:
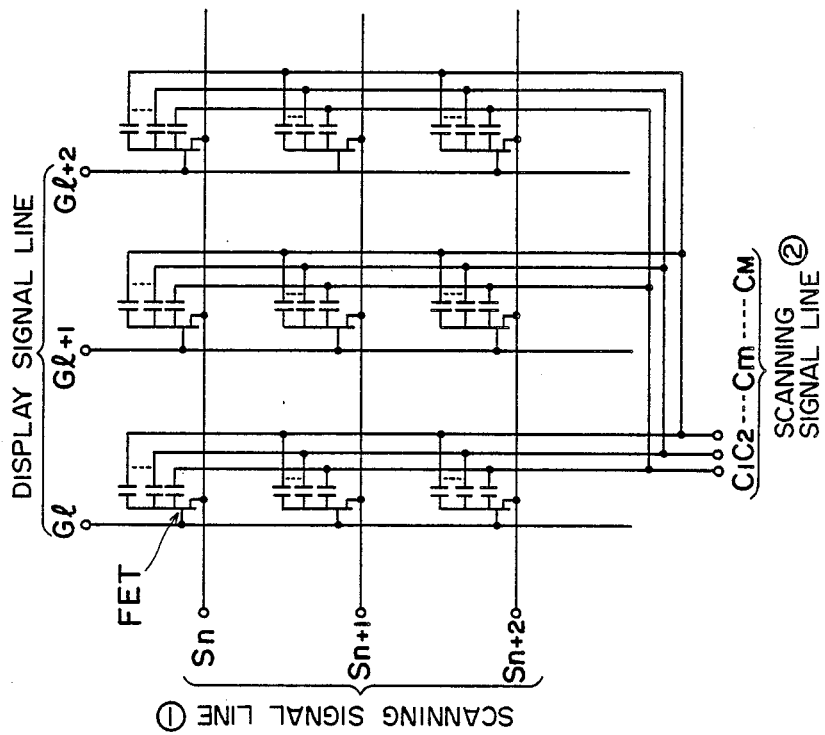
FIGS. 9 and 10 are circuit diagrams illustrating other basic concepts of the invention.

FIG. 9 shows a circuit structure, which is based on a different basic concept of the invention. This circuit can be used in place of the circuit shown in FIG. 1. In this circuit, either source or drain of each FET serves as a first terminal, which is provided with a plurality of picture element electrodes. Counter electrodes are provided so that they oppose the respective picture element electrodes. Signal lines leading from the counter electrodes extend parallel to a gate signal line leading from the gate, i.e., a third terminal, of the FET. A signal line leading from the remaining terminal (either drain or source) of the FET extends perpendicular to the two different kinds of signal lines noted above. This display panel can be driven by applying a display signal to the gate signal line and applying a scanning signal to the other two different kinds of signal lines of each FET.

As is apparent from the circuit structure of FIG. 9, according to the invention, image display is accomplished by using two of three different signal line groups as scanning signal line groups for the selection of writing lines while applying a display signal to the remaining signal line group. More specifically, a signal voltage is applied to the gate of an FET so that the FET is in a gate "ON" state, while an electric field is set up simultaneously between the source and drain, which are FET terminals other than the gate, and the polarity of the field is controlled to control two display states, i.e., first and second orientation state. According to the invention, a ferroelectric liquid crystal is thus used, which can selectively assume either one of two, i.e., first and second optically stable states according to the polarity of the electric field, that is, which is a bistable material with respect to the electric field. In an FET serving as an active element, selection as to which one of the two terminals other than the gate terminal serves as source and the other as drain is determined according to the polarity of the applied voltage regardless of whether the FET is of the p- or n-type. In an n-type FET, the terminal that is held at a lower potential serves as the source, while in a p-type FET the terminal held at a higher potential serves as the source.

In the circuit structure of FIG. 9, n-type FETs, preferably TFTs (thin film transistors), are used as the active elements and the liquid crystal is a ferroelectric liquid crystal. Various voltages for writing the display pattern shown in FIG. 5 are the same as described before.

Figure 10:
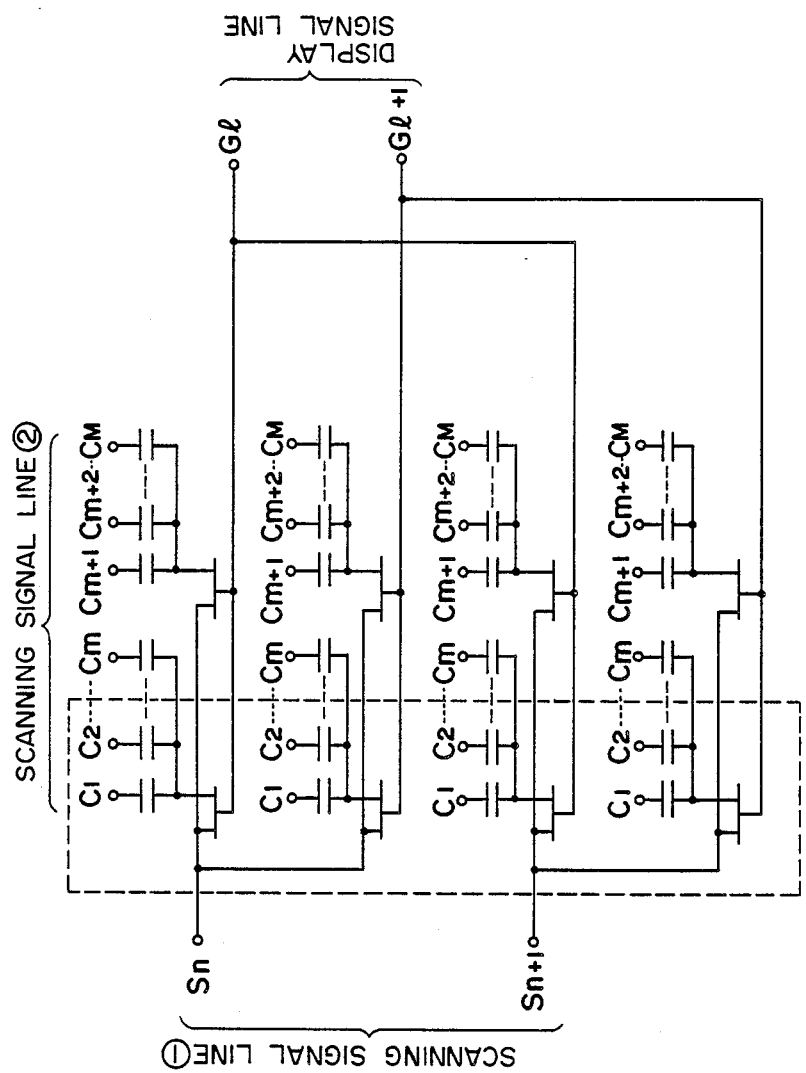

FIG. 10 shows a circuit structure, which is based on a further basic concept of the invention. In this instance, either source or drain of each FET serving as a first terminal, is provided with a plurality of picture elements. Counter electrodes are pvodied so that they oppose the respective picture element electrodes. Signal lines leading from the counter electrodes extend perpendicular to a gate signal line leading from the gate as a third terminal of the FET and also to a signal line leading from a second terminal constituted by the drain or source which does not constitute the third terminal of the FET. This display panel is driven by applying a display signal to the gate signal line and applying scanning signals to the other two signal lines. In this system, like signal is fed to terminals $C_m$ with the same subscript m. Generally, where there are n picture elements for display, $\sqrt{n} \times 2$ lead lines are necessary. In contrast, according to the invention, only $3\sqrt{n} \times 3$ lead lines are necessary. Where there is no natural number corresponding to the cubic root of n, a slightly greater number of lead lines have to be provided.

Figure 11:
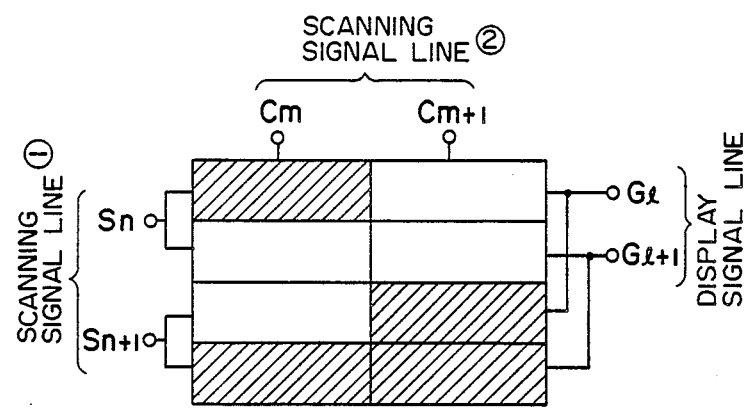
FIG. 11 is a view showing a different display pattern.

As is apparent from the circuit structure of FIG. 10, according to the invention, image display is accomplished by using two of the three different signal line groups as scanning signal line groups for the selection of a writing line while applying a display signal to the remaining signal line group. More specifically, a signal voltage is applied to the gate of an FET so that the FET is in a gate "ON" state, while an electric field is set up simultaneously between the source and drain, which are terminals other than the gate, and the polarity of the field is controlled to switch the two display states, i.e., first and second orientation states. According to the invention, a ferroelectric liquid crystal is thus used, which can selectively assume either one of two, i.e., first and second, optically stable states depending on the polarity of the electric field. Thus, a ferroelectric liquid crystal having bistability with respect to the electric field, is used. In an FET serving as an active element, whether one of the two terminals other than the gate terminal serves as source and the other as drain are determined according to the polarity of the applied voltage regardless of whether the FET is of the p- or n-type. In an n-type FET, the terminal that is held at a lower potential serves as the source, while in a p-type FET the terminal held at a higher potential serves as the source. A desired display pattern as shown in FIG. 11 is completed through the operations shown above at the phases $t_1$ to $t_8$ shown in FIG. 7, for respective picture elements shown in FIG. 4. In the circuit structure of FIG. 10, n-type FETs, preferably TFTs (thin film transistors), are used as the active elements and the liquid crystal is a ferroelectric liquid crystal. Various voltages for writing the display pattern shown in FIG. 11 are the same as described before.

Figure 12:
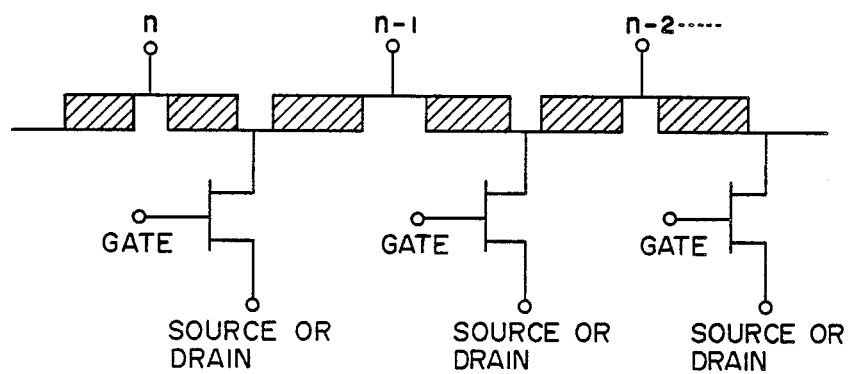
FIG. 12 is a view showing an electrode structure where a counter electrode is divided.

A still further basic concept of the invention will now be described with reference to FIG. 12. The Figure illustrates a divided counter electrode structure. Referring to the Figure, counter electrodes are shown at n, n-1, n-2, ..., and liquid crystal layers shown shaded. According to the invention, the image display is accomplished by using two signal line groups (i.e., source and drain) among three signal line groups (i.e., source, drain and gate) as scanning signal line groups to select a writing line while applying a display signal to the remaining signal line (i.e., gate). More specifically, the counter electrodes are disposed in the form of stripes so that each strides two adjacent picture elements formed on a substrate and that the individual counter electrode stripes are two-dimensionally perpendicular to the gate signal lines formed on the substrate.

In the conventional matrix structure, the number of its picture elements is expressed by the product of the numbers of the vertical and horizontal lead lines. That is, where there are 10,000 picture ($100 \times 100 = 10,000$) elements for display, for instance, a total of 200 lead lines are necessary. In the case of the above structure where each counter electrode strides two picture elements adjacent to each other, with 10,000 picture elements (i.e., $100 \times 50 \times 2 = 10,000$ picture elements) only a total of $100 + 50 + 2 = 152$ lead lines are necessary. Thus, the number of lead connections to the external circuitry can be extremely reduced.

Figure 13:
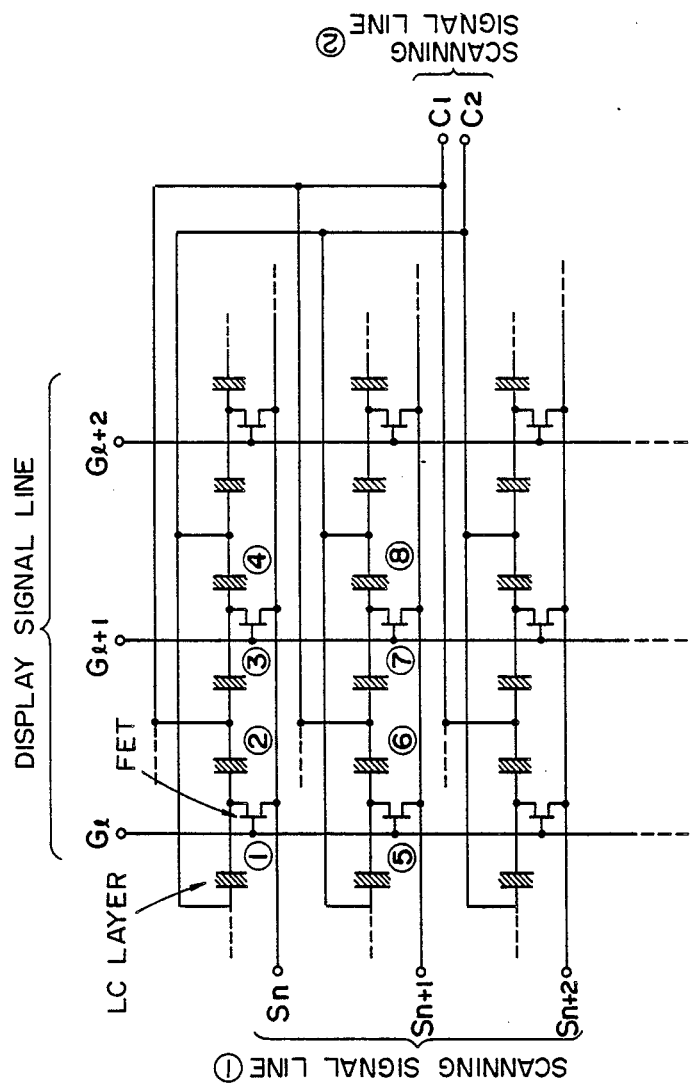
FIGS. 13 and 14 are circuit diagrams showing respective active matrix circuits embodying the invention.

The circuit structure of the liquid crystal display panel and the method of driving the same according to the invention will now be described. FIG. 13 shows a circuit structure of an embodiment of the display panel according to the invention, in which a ferroelectric liquid crystal is driven by an active matrix system using n-type FETs. This structure is used to write a display pattern, e.g., as shown in FIG. 5.

Referring to FIG. 13, labeled $G_l$, $G_{l+1}$, $G_{l+2}$, ... are display signal lines leading from the gates of FETs, $S_n$, $S_{n+1}$, $S_{n+2}$, ... scanning signal lines ① leading from the sources of drains of the FETs, and $C_1$, $C_2$, ... scanning signal lines ② leading from the counter electrodes each disposed to stride two adjacent picture elements.

It is to be noted that the signal lines from the counter electrodes and the signal lines from the gates are perpendicular to one another.

Voltage values for writing the display pattern shown in FIG. 5 with this circuit structure are the same as described before. Further, numbers ① to ⑧ indicating respective liquid crystal layers shown in FIG. 13 corresponding to those shown in FIG. 4, indicating picture elements, the display state of which is shown in FIG. 7. The display pattern shown in FIG. 5 is completed through operations shown above at phases $t_1$ to $t_8$.

Figure 14:
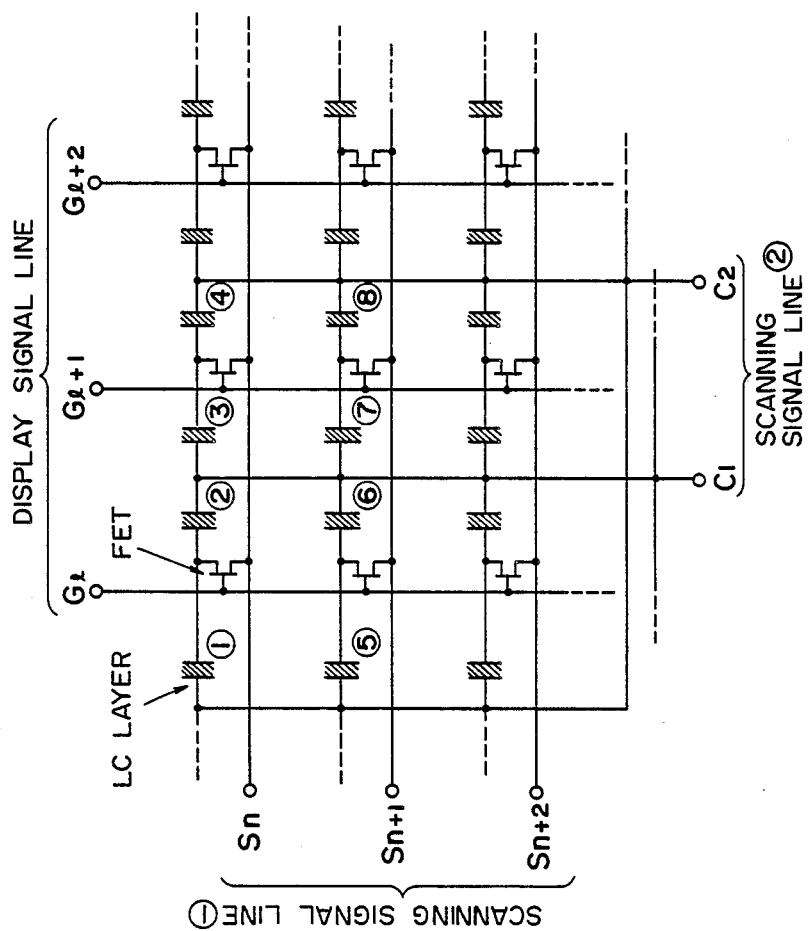

FIG. 14 shows a different embodiment, in which the counter electrode stripes as noted above extend two-dimensionally, in parallel with the gate signal lines on the substrate.

Referring to FIG. 14, labeled $G_l$, $G_{l+1}$, $Gl+2$, ... are display signal lines leading from the gates of FETs, $S_n$, $S_{n+1}$, $S_{n+2}$, ... scanning signal lines ① leading from the sources or drains of the FETs, and $C_1$, $C_2$, ... scanning signal lines ② leading from the counter electrodes each striding two adjacent picture elements.

It is to be noted that the signal lines from the counter electrodes are parallel to the signal lines from the gates.

Voltage values for writing the display pattern shown in FIG. 5 with this circuit structure are the same as described before.

The display panel and the method of driving the same according to the invention utilize a material capable of being optically modulated, which can selectively assume one of two, i.e., first and second, optically stable states depending on the applied electric field. That is, a bistable material with respect to the electric field, particularly a liquid crystal having such a character, is utilized.

The liquid crystal having bistable character that can be used for the driving method according to the invention, is most suitably a chiral smectic liquid crystal. Among the chiral smectic liquid crystals, those showing chiral smectic C phase (SmC*) or H phase (SmH*) are especially preferred. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxy-benzylidene-p'-amino-2-chloropropyl cinnamate (HOBACPC), 4-o-(2-methyl) butylresorcylidene-4'-octylaniline (MBRA8), etc.

When a device is constituted using these materials, the device may be supported with a block of copper, etc., in which a heater is embedded in order to realize a temperature condition where the liquid crystal compounds assume a chiral smectic phase.

Figure 2:
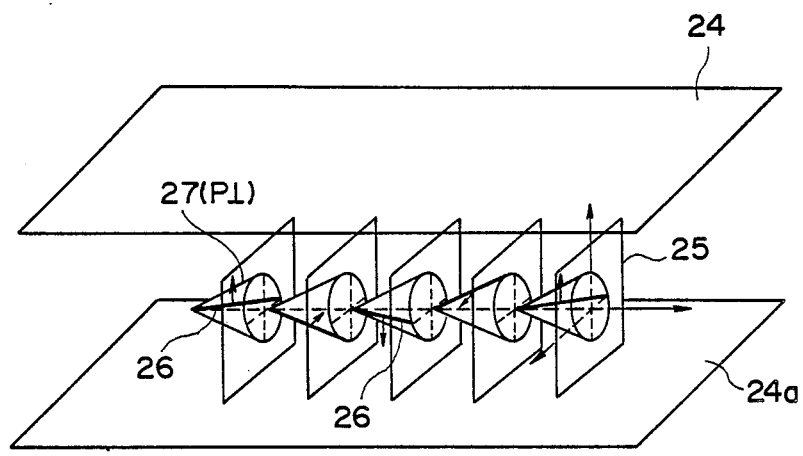
FIGS. 2 and 3 are schematic perspective views illustrating the basic operation principle of a ferroelectric liquid crystal device used in accordance with the invention.
Figure 3:
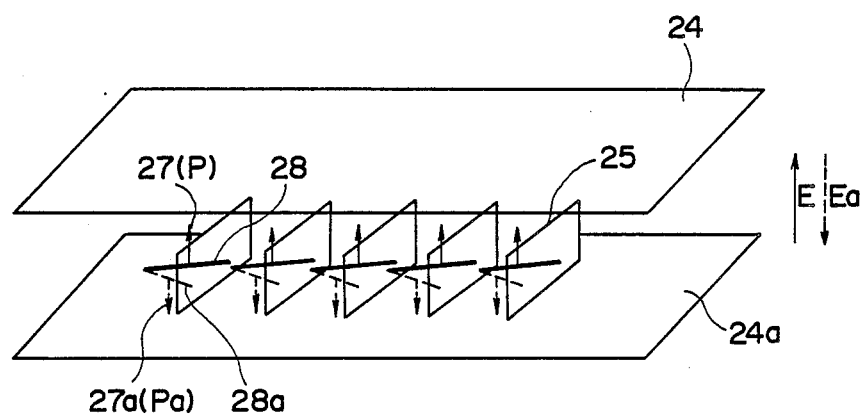

Referring to FIG. 2, there is schematically shown an example of a ferroelectric liquid crystal cell for explanation of the operation thereof. Reference numerals 24 and 24a denote base plates (glass plates) on which a transparent electrode of, e.g. $In_2O_3$, $SnO_2$, ITO (Indium-Tin Oxide), etc., is disposed, respectively. A liquid crystal of an SmC*- or SmH*-phase in which liquid crystal molecular layers 25 are oriented perpendicular to surfaces of the glass plates is hermetically disposed therebetween. A full line 26 shows liquid crystal molecules. Each liquid crystal molecule 26 has a dipole moment (P⊥) 27 in a direction perpendicular to the axis thereof. When a voltage higher than a certain threshold level is applied between electrodes formed on the base plates 24 and 24a, a helical structure of the liquid crystal molecule 26 is loosened or unwound to change the alignment direction of respective liquid crystal molecules 26 so that the dipole moment (P⊥) 27 are all directed in the direction of the electric field. The liquid crystal molecules 26 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1 $\mu$), the helical structure of the liquid crystal molecules is loosened even in the absence of an electric field whereby the dipole moment assumes either of the two states, i.e., P in an upper direction 27 or Pa in a lower direction 27a as shown in FIG. 3. When electric field E or Ea higher than a certain threshold level and different from each other in polarity as shown in FIG. 3 is applied to a cell having the above-mentioned characteristics, the dipole moment is directed either in the upper direction 27 or in the lower direction 27a depending on the vector of the electric field E or Ea. In correspondence with this, the liquid crystal molecules are oriented in either of a first stable state 28 and a second stable state 28a.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field E is applied to the liquid crystal molecules, they are oriented in the first stable state 28. This state is kept stable even if the electric field is removed. On the other hand, when the electric field Ea of which direction is opposite to that of the electric field E is applied thereto, the liquid crystal molecules are oriented to the second stable state 28a, whereby the directions of molecules are changed. This state is also kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$, particularly 1 to 5 $\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

Figure 15:
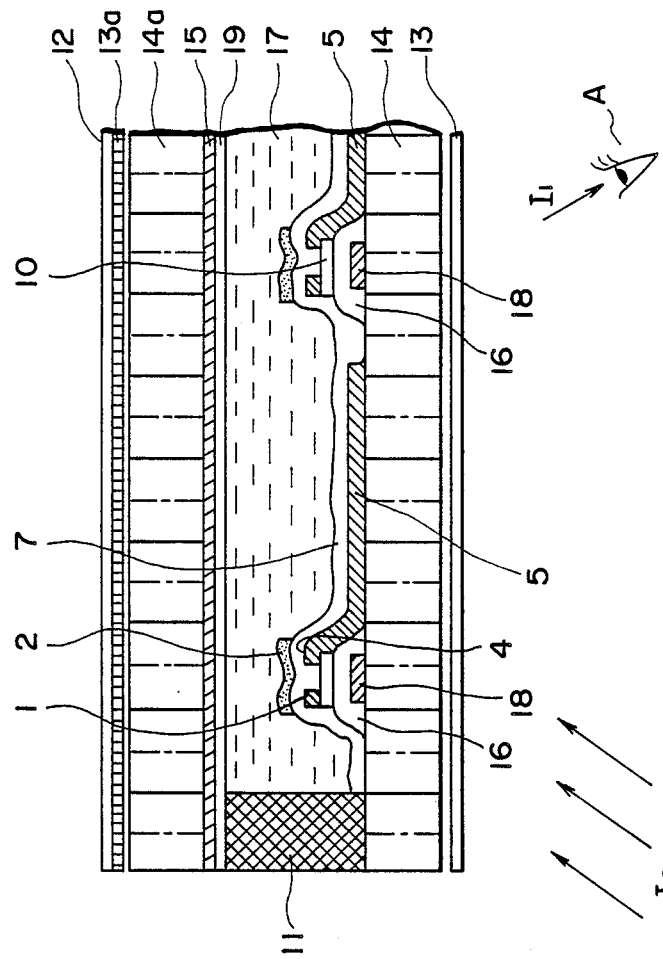
FIG. 15 is a sectional view showing a liquid crystal device used in accordance with the invention.
Figure 16:
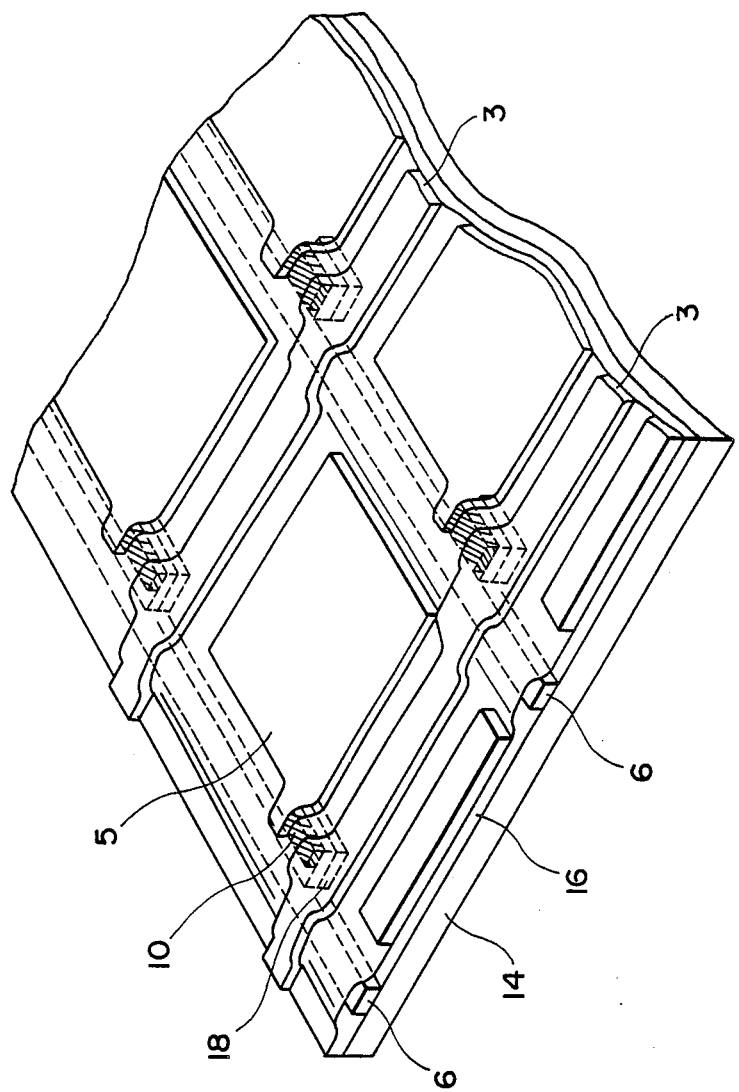
FIG. 16 is a perspective view of a TFT base plate used in the present invention.

FIG. 15 is a sectional view showing a ferroelectric liquid crystal cell using TFTs, FIG. 16 is a perspective view showing a TFT base plate, and FIGS. 17A to 17E are plan views showing different cell structures according to the invention.

The ferroelectric liquid crystal cell shown in FIGS. 15 and 16 serves as a liquid crystal device used for the driving method according to the invention. As is shown, on a base plate 14, made of glass, plastics, etc., are formed TFTs, each of which consists of a gate electrode 18 connected to a signal line 6, a semiconductor film 10 (of amorphous silicon doped with hydrogen atoms) formed over the gate electrode via an insulating film 16 (e.g., a silicon nitride film doped with hydrogen atoms) and two terminals 1 and 4 disposed contiguous to the semiconductor film 10. Picture element electrodes 5 (of ITO) are also formed on the base plate 14, each being connected to the terminal 4 of each TFT. The terminal 1 of a TFT is connected to a signal line 3. The parts described above are covered by an insulating layer 7 of such material as polyimide, polyamide, polyvinyl alcohol, polyparaxylylene, SiO and $SiO_2$. Light shielding films 2 of such material as aluminum and chromium are formed on the insulating layer 7. On the opposed surface of the other base plate 14a are formed counter electrodes 15 (of ITO). An insulating film 19 is also formed, which also serves as an orientation controlling film. Ferroelectric liquid crystal 17 as noted above is provided between the base plates 14 and 14a. A sealing material 11 is provided along the peripheries of the base plates 14 and 14a to seal or enclose the ferroelectric liquid crystal 17.

Polarizers 13 and 13a are provided in the arrangement of cross nicols on opposite sides of the liquid crystal device having the above cell structure. Further, a reflector 12 consisting of a light-scattering aluminum sheet or plate is provided behind the polarizer 13a so that an observer A can recognize the display state from reflected light $I_1$ resulting from incident light $I_0$.

In the above Figures, the source and drain electrodes of FET are called as such when and only when current flows from the drain to the source. It is possible that the source serves as the drain depending on the function of FET.

Figure 17A:
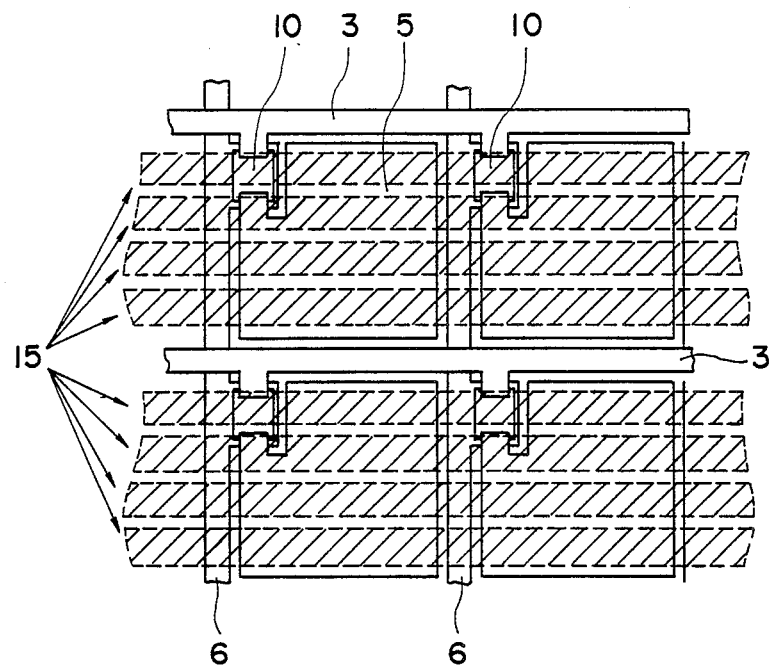
FIGS. 17A to 17E are respectively plan views showing liquid crystal devices used in accordance with the invention.
Figure 17B:
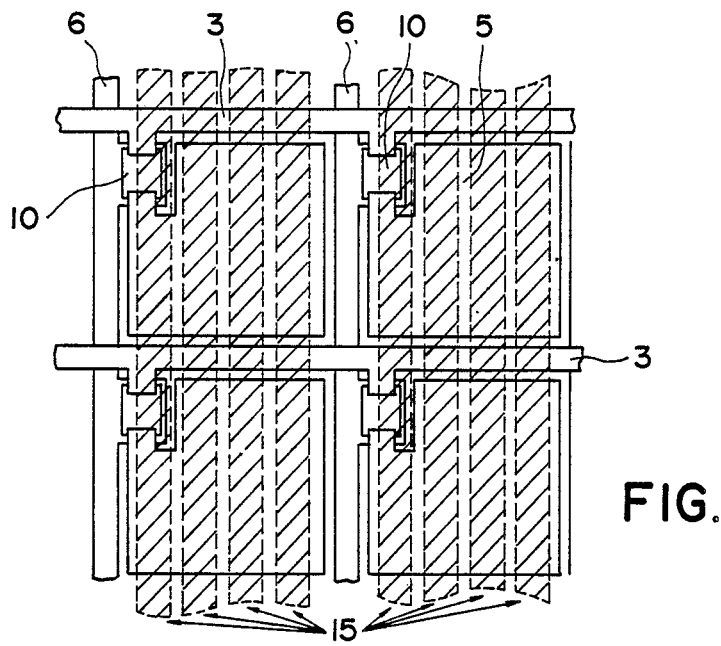
Figure 17C:
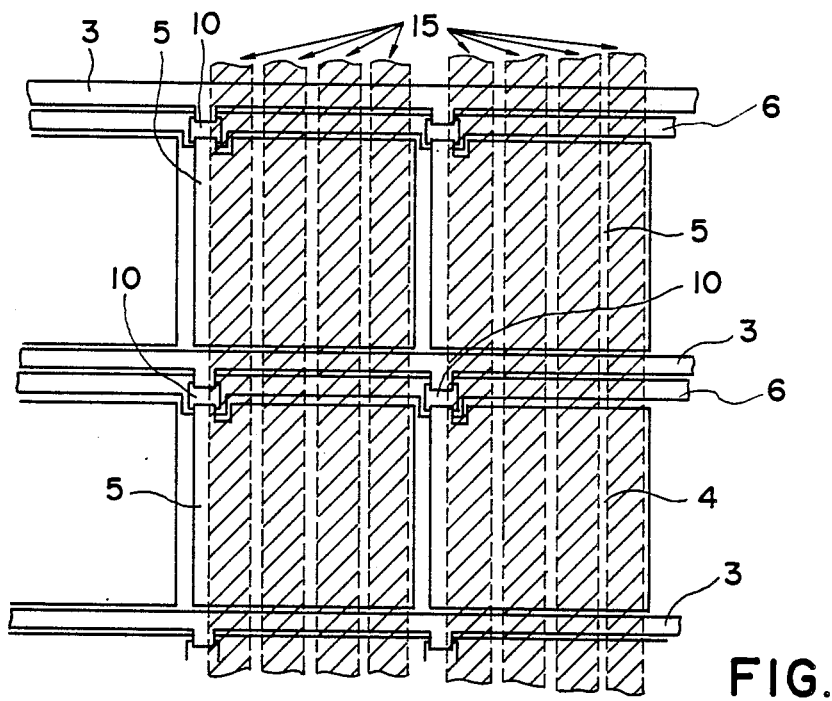

In the cell structure shown in FIG. 17A, in which a plurality of stripe form counter electrodes 15 are provided so that they face respective picture element electrodes 5 connected to a first terminal other than the gate, i.e., either the source of drain, of each FET 10 on an active matrix base plate, a signal line 3 leading from a second terminal constituted by either the drain or source of the FET 10 extends parallel to the counter electrodes 15, and a gate signal line 6 leading from a third terminal constituted by the gate of the FET extends perpendicular to the signal line 3 noted above and the counter electrodes 15.

In the cell structure shown in FIG. 17B, in which again a plurality of counter electrodes 15 are provided so that they face respective picture element electrodes 5 connected to a first terminal other than the gate, i.e., either the source or drain, of each FET 10 on an active matrix base plate, signal lines formed by the counter electrodes 15 extend parallel to a gate signal line 6 leading from a third terminal constituted by the gate of the FET 10 and perpendicular to a signal line 3 leading from a second terminal constituted by either the drain or source of the FET 10.

In the cell structure shown in FIG. 17C, in which again a plurality of counter electrodes 15 are provided so that they face respective picture element electrodes 5 connected to a first terminal other than the gate, i.e., either the source or drain, of each FET 10 on an active matrix base plate, signal lines formed by the counter electrodes 15 extend perpendicular to a gate signal line 6 leading from a third terminal constituted by the gate of the FET 10 and also to a signal line 3 leading from a second terminal constituted by either the drain or source of the FET 10.

Figure 17D:
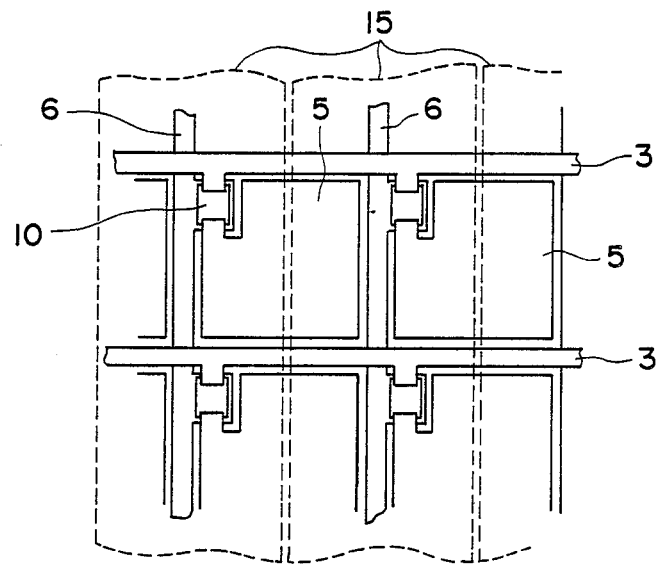

In the cell structure shown in FIG. 17D, in which one base plate of the liquid crystal cell is provided with an active matrix and counter electrodes 15 are respectively divided in an area corresponding to each image display picture element (5) on the active matrix base plate, the counter electrodes 15 are disposed in the form of stripes, each striding a plurality of picture element (5) on the active matrix base plate.

As is apparent from FIG. 17D, each counter electrode 15 may be disposed to overlap one half of a plurality of picture elements on the active matrix base plate.

In the structure shown in FIG. 17E, in which again one base plate of the liquid crystal cell is provided with an active matrix while counter electrodes 15 are respectively divided in an area corresponding to each image display picture element (5) on the active matrix base plate and are disposed in the form of stripes so that each strides a plurality of picture elements (5) on the active matrix base plate, the counter electrode stripes extend perpendicular to the gate signal lines 6.

Figure 17E:
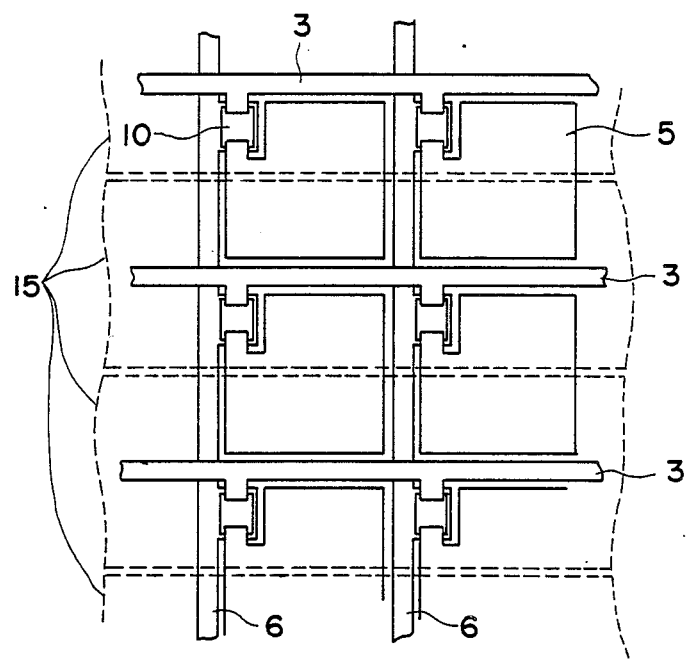

Again as is apparent from FIG. 17E, each counter electrode 15 may be disposed to overlap one half of a plurality of picture elements (5) on the active matrix base plate.

As has been described in the foregoing, according to the invention, signal lines can be extremely reduced compared to the prior art circuit structure.

In addition, according to the invention the counter electrodes of a liquid crystal cell based on the active matrix system are disposed in the form of stripes so that each strides two adjacent picture elements on the base plate. Thus, signal lines from the counter electrodes can be extremely reduced compared to the prior art structure. It is thus possible to simplify the mounting of circuit components as well as simplifying the circuit design and reducing the circuit scale. Further, it is possible to increase the display speed and to enlarge the display picture size if a ferroelectric liquid crystal is used as a liquid crystal material as in the embodiments given above.

What is claimed is:

1. A display panel comprising:
   an active matrix base plate comprising a plurality of thin film transistors disposed along a plurality of rows and a plurality of columns so as to form a matrix, each thin film transistor having a first terminal as a source or drain, a second terminal as a gate and a third terminal as the drain or source; the first terminals of the transistors disposed along one of the rows being commonly connected to one of a plurality of first signal lines, the second terminals of the transistors disposed along one of the columns being commonly connected to one of a plurality of second signal lines, and the third terminal of each of the transistors being connected to one of a plurality of first electrodes;
   a counter base plate disposed opposite to the active matrix base plate comprising a first plurality of stripe-shaped second electrodes as third signal lines, said first plurality of second electrodes being divided into plural groups each comprising a second plurality of second electrodes, one of said plurality of first electrodes on the matrix being disposed opposite to a group of the second plurality of second electrodes on the counter base plate so as to define a picture element;
   a liquid crystal disposed between the active matrix base plate and the counter base plate; and
   means for applying a first scanning signal to the third signal lines, for applying a second scanning signal to the first signal lines, and for applying a display signal to the second signal lines, wherein the first scanning signal is sequentially applied to the third signal lines in a period designated by application of the second scanning signal to a selected first signal line.

2. The display panel according to claim 1, wherein the second signal lines extend in parallel with the third signal lines, and the first signal lines extend perpendicular to the second and third signal lines.

3. The display panel according to claim 1, wherein said display signal is applied to said second signal line leading from the second electrode as the gate of the thin film transistor.

4. The display panel according to claim 1, wherein the first signal lines extend in parallel with the third signal lines, and the second signal lines extend perpendicular to the first and third signal lines.

5. The display panel according to claim 1, wherein the capacitance of the liquid crystal is electrically coupled to said first electrodes.

6. The display panel according to claim 1, wherein said liquid crystal is a chiral smectic liquid crystal.

7. A display panel according to claim 1, wherein the third signal lines extend perpendicular to the first and second signal lines.

8. The display panel according to claim 7, wherein said display signal is applied to said second signal lines.

9. The liquid crystal display panel according to claim 7, wherein said ferroelectric liquid crystal is a chiral smectic liquid crystal.

10. A display panel according to claim 1, wherein said second scanning signal is applied to the first signal lines and said display signal is applied to the second signal lines.

11. A display panel according to claim 1, wherein said first and second scanning signals respectively comprise a unidirectional pulse, one unidirectional pulse in the second scanning pulse being synchronized with a plurality of unidirectional pulses in the first scanning signal.

12. The display panel according to claim 1, wherein said second scanning signal has a polarity which is reversed from one scanning period to another scanning period.

13. A display panel according to claim 1, wherein said first scanning signal has a polarity which is reversed from one scanning period to another scanning period.

* * * * *